(12) United States Patent
Wilfong

(10) Patent No.: US 7,085,128 B2
(45) Date of Patent: Aug. 1, 2006

(54) PRECONSTRUCTION MULTIPLE UTILITY METER PEDESTAL AND METHOD OF INSTALLATION

(75) Inventor: M. Scott Wilfong, Northville, MI (US)

(73) Assignee: Corby Energy Services, Inc., Belleville, MI (US)

( * ) Notice: Subject to any disclaimer, the term of this patent is extended or adjusted under 35 U.S.C. 154(b) by 110 days.

(21) Appl. No.: 10/733,206

(22) Filed: Dec. 9, 2003

(65) Prior Publication Data
US 2004/0165340 A1  Aug. 26, 2004

Related U.S. Application Data

(60) Provisional application No. 60/432,311, filed on Dec. 9, 2002.

(51) Int. Cl.
*H02B 1/00* (2006.01)

(52) U.S. Cl. .......................... 361/665; 361/659; 174/38
(58) Field of Classification Search ........ 361/659–669; 174/37–38, 45 R; 73/201; 324/156
See application file for complete search history.

(56) References Cited

U.S. PATENT DOCUMENTS

| | | | | |
|---|---|---|---|---|
| 1,932,537 A | * | 10/1933 | Straight | 48/190 |
| 3,614,538 A | * | 10/1971 | Nickola | 361/601 |
| 3,815,859 A | | 6/1974 | Leopold et al. | |
| 3,868,080 A | | 2/1975 | Olson | |
| 3,879,641 A | * | 4/1975 | Byrd | 361/664 |
| 4,133,021 A | * | 1/1979 | King et al. | 361/660 |
| RE31,359 E | | 8/1983 | Nickola | |
| 4,519,657 A | * | 5/1985 | Jensen | 439/191 |
| 4,751,610 A | * | 6/1988 | Nickola | 361/664 |
| 4,763,863 A | | 8/1988 | Cote | |
| 4,864,467 A | | 9/1989 | Byrd et al. | |
| 4,887,187 A | | 12/1989 | Nickola | |
| 5,377,074 A | | 12/1994 | Byrd | |
| 5,400,212 A | * | 3/1995 | Hanson | 361/665 |
| 5,838,078 A | * | 11/1998 | Tipton | 307/147 |
| 5,844,134 A | | 12/1998 | Jiles | |
| 6,568,645 B1 | | 5/2003 | Maddox | |

* cited by examiner

*Primary Examiner*—Lynn Feild
*Assistant Examiner*—Robert J. Hoffberg
(74) *Attorney, Agent, or Firm*—Dickinson Wright PLLC

(57) ABSTRACT

A preconstruction utility meter (PCM) pedestal providing attachment means for both a gas meter and an electric meter. The device may also provide a situs for telephone and cable connections. The device allows for pre-occupancy use of utilities.

17 Claims, 3 Drawing Sheets

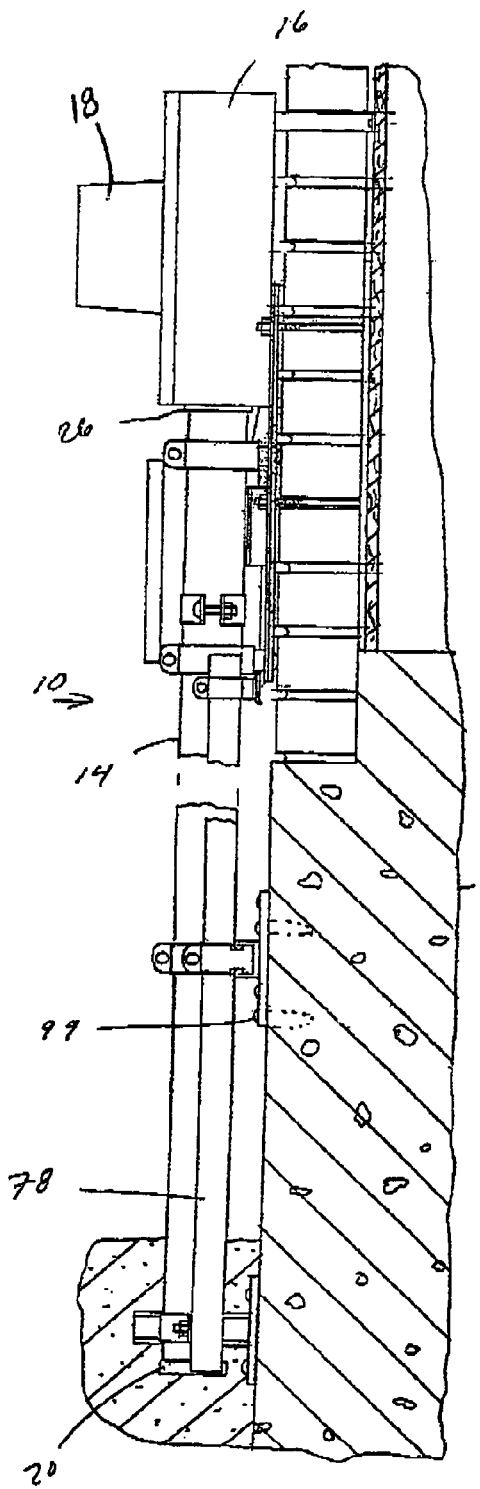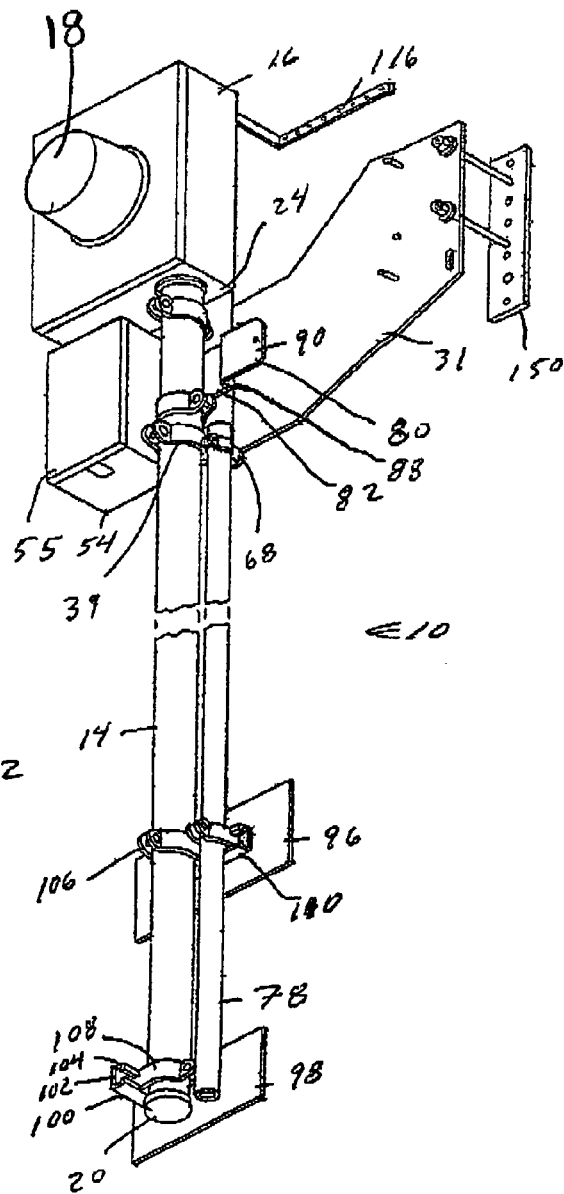
FIG 2
FIG 3

PRECONSTRUCTION MULTIPLE UTILITY METER PEDESTAL AND METHOD OF INSTALLATION

This application claims the benefit of provisional application 60/432,311 filed Dec. 9, 2002

BACKGROUND OF THE INVENTION

1. Field of the Invention

This invention pertains generally to devices relating to utility meter pedestals.

2. Description of the Prior Art

This invention relates to a preconstruction utility meter pedestal that is adapted to be mounted on a building foundation, after the foundation has been completed but before the construction of a building on the foundation has been started. In new construction projects, there typically is no utility service until construction has progressed to a certain degree. Utility companies are often unwilling to run utilities to a site until the service meter can be secured from theft of service and secured from damage during continued construction. Conversely, those same utility companies, particularly electricity providers, have a commercial incentive to begin service as early as possible to generate profits from sale of service. Contractors who run power tools such as electrical saws prefer to have on-site power so that they can avoid transporting portable electric generators to the site. An additional benefit of on-site electrical service is the availability of electric lighting without the noise of portable generators, which allows workers to work or set up before daylight and to work or clean up after sundown without disturbing surrounding residents.

An additional issue that has grown in importance is the act of bringing the utilities to the site from the common line. Typically, utilities are laid at the beginning of a development to one or more distribution points, such as utility boxes at the street easement between parcels. Nearly all electrical, telephone and cable services are distributed to developments below ground, as are all natural gas services. This has caused problems in the sequential digging of trenches from the most downstream utility distribution point to the construction site. Each utility typically digs its own trench, but only after having any previously installed utilities marked, which adds costs but still does not eliminate accidents.

Natural gas utilities have been bypassed in recent advancements in providing preconstruction utility service to construction sites. Safety requirements to keep gas utility meters a minimum distance from electrical connections that are defined as a "source of ignition" and to keep electrical lines a minimum distance from gas lines in a common ditch, as well as scheduling complications, have discouraged the use of the same trench for electrical and gas lines. Further, the lack of security has discouraged the early installation of gas service.

However, there is a benefit to providing natural gas to construction sites. Once a construction is framed and shielded from the elements, environmentally sensitive work can begin. For example, finish carpentry and drywall installation must wait until the interior is protected from rain or snow. However, in northern climates, the temperature can also adversely affect materials and workers. By providing heat into the framed construction, the work season can be extended into cold weather. Although portable propane heaters are often used, such heaters typically require very large and cumbersome tanks and are very localized in their effect. Providing natural gas service to the site allows for early installation and use of the building heating system. This is a much more cost-efficient source of heat, greatly reduces the effort required by eliminating "portable" propane tanks, and can provide uniform and widespread heat throughout the building. The natural gas provider commercially benefits from the increase sale of services and potentially benefits from the common use of a single utility ditch to the construction site. Unfortunately, to date there have not been accepted natural gas preconstruction meters that are sufficiently reliable and which can ensure proper mounting and spacing relative to nearby electrical service.

Electrical preconstruction utility meter pedestals have become more common in the industry. However, preconstruction gas utility meters are less common and essentially involve the earlier installation of a meter directly on an upwardly extending rigid gas supply line. Another known preconstruction installation is the use of a standard brick bracket which is nailed into the studs and solely supported thereupon, leaving the utility connections unprotected.

U.S. Pat. No. 4,864,467 (incorporated herein by reference) discloses a utility meter pedestal which is adapted to be mounted on a building foundation and which includes a rigid, vertical steel post, having an L-shaped cross section, to which top and bottom steel plates are fixedly secured, with the bottom plate comprising a mounting plate lying flush against the outer face of a building foundation at a below grade location and being fastened to the foundation by power driven nails. A utility meter box is mounted on a front face of the upper plate. A rigid, metal flat strap is secured to the rear surface of the metal post in a position between the upper and lower plates, and it extends rearwardly from the post, at a right angle thereto. The rigid, metal flat strap overlies the top of the foundation, and is secured to the top of the foundation by power driven nails. An elongated plastic service conduit is attached to the front face of the post and it extends in parallel spaced relationship with the post. The service conduit houses an electrical service line that extends from an underground utility line to meter in said utility meter box. The electrical service line conduit is secured to the metal post by means of a clamp bracket.

A problem encountered in the use of the utility meter pedestal disclosed in U.S. Pat. No. 4,864,467 is that the rigid, metal flat strap secured to the top of the foundation is subject to being detached from the foundation and the utility meter pedestal pulled outwardly away from the foundation by building contractors, because the location of said strap conflicts with the operations of carpenters and masons working behind the pedestal in the process of constructing a building on the top of the foundation. Under such construction conditions, the utility meter pedestal disclosed in said patent is subject to damage, and a subsequent rejection by electrical inspectors. Also, follow-up repair operations are necessitated which increase the costs of employing such utility meter pedestals.

A disadvantage in the use of the utility meter pedestal disclosed in the '467 patent is that it is difficult to secure accurately the pedestal post in a vertical position on a foundation, because of the fact that both the lower mounting plate and the rigid, metal flat strap for attachment to the top of the foundation must be attached by power driven nails while the post is held manually in a vertical position by the use of a carpenter's level. In many instances, the action of inserting the power driven nails moves the rigid, metal flat strap and lower plate, so as to move the pedestal post out of the desired vertical position during such action.

Still another disadvantage in the use of the utility meter pedestal disclosed in the '467 patent is that it requires an additional member, besides the rigid, vertical steel post, in the form of a service line conduit to house the power line extension from an underground utility service line to the meter box attached to the top of the rigid, vertical steel post. The utility meter pedestal disclosed in said patent also does not provide any service conduit, for housing communications cables such as phone and cable television service lines, to prevent damage to such cables during a building construction period. Without such a separate service conduit the last mentioned cables are left lying on the ground by the foundation where they may be damaged, and need repair or replacement, at added costs.

U.S. Pat. No. 5,400,212 to Hanson (incorporated herein by reference) provided an improvement over the existing art by providing a superior preconstruction utility meter for electrical and other cable services. However, there was still the obstacle of locating and coordinating installation of gas utility in addition to other utilities.

SUMMARY OF THE INVENTION

The present invention solves the aforedescribed problems of the prior art utility meter pedestals by providing an improved preconstruction utility meter pedestal for utilities, including electric power and natural gas, as well as telephone, television and other communication lines which may be installed in the same underground trench. The improved preconstruction utility meter pedestal comprises a vertical tubular support member, such as an elongated rigid steel pipe which is open at the top and bottom ends thereof. A metal electrical utility meter box and a metal gas utility meter box are rotatably, adjustably secured to the top end of the elongated rigid steel pipe and have operatively mounted therein conventional utility meters. An elongated rigid steel pipe functions as both a vertical support member for the metal utility meter boxes and as an electrical service line conduit for conducting or housing an electric service line for an underground utility service line to the utility meter in the metal utility meter box. The utility meter pedestal includes a foundation upper mounting plate and a foundation lower mounting plate for attachment to a building foundation. The elongated rigid steel pipe is adjustably mounted relative to the foundation upper and lower mounting plates by adjustable clamping means so as to permit the elongated rigid steel pipe to be adjusted up and down to meet a Utility Company specification for meter height above grade on a foundation. The adjustable clamping means also permits the elongated rigid steel pipe to be adjusted left and right to plumb to a vertical position, and in and out to plumb vertical if the foundation outer wall on which the mounting plates are attached is not vertically straight.

The utility meter pedestal includes a pair of meter mounting plates which have upper ends fixed to the back of the respective meter utility boxes and lower ends rotatably, adjustably secured to the upper portion of the pedestal elongated rigid steel pipe. The meter mounting plates are mounted in fixed relation to provide the required separation of the electrical and gas utility meters mounted thereon. A removable temporary outlet box is supported by the electrical utility meter box and it is wired to the meter in said meter box and to the electrical service supplied through the elongated rigid metal steel pipe, to provide electrical service availability during the construction phase of the building to be mounted on a foundation on which the utility meter pedestal is operatively mounted.

The utility meter pedestal includes a separate conduit made from a suitable plastic material which is mounted in a position parallel to the elongated rigid steel pipe for housing communication cables such as phone, television, and the like, which are to be installed through the same underground utility service which provides the electrical utility service line. The conduit for the communication cables has its upper end secured to the lower end of the top back plate, and it is also secured to the foundation upper mounting plate at an intermediate portion of its overall length. The utility meter pedestal includes an adjustable mounting bracket secured to the electrical meter mounting plate which is adapted to have mounted thereon a telephone interface box. The adjustable mounting bracket may be adjusted to different positions to permit the mounting thereon telephone interface boxes of various sizes.

The foundation lower mounting plate for the elongated rigid steel pipe is adapted to be secured to the outer face of a building foundation at a below grade location, and to be fastened to the foundation by any suitable means, e.g., power driven nails. The foundation upper mounting plate is provided in different configurations which permits the utility meter pedestal to be installed selectively on a building foundation wherein a siding is to be installed on the exterior building walls, or on a building foundation having a brick ledge.

BRIEF DESCRIPTION OF THE DRAWINGS

FIG. 2 is a broken, right side elevation view of the preconstruction utility meter pedestal illustrated in FIG. 1, and showing the utility meter pedestal mounted to the outer side of a building foundation wall of a building having a brick ledge.

FIG. 3 is a broken perspective view of the utility meter pedestal illustrated in FIGS. 1 and 2.

DESCRIPTION OF THE PREFERRED EMBODIMENT(S)

Figure 1:
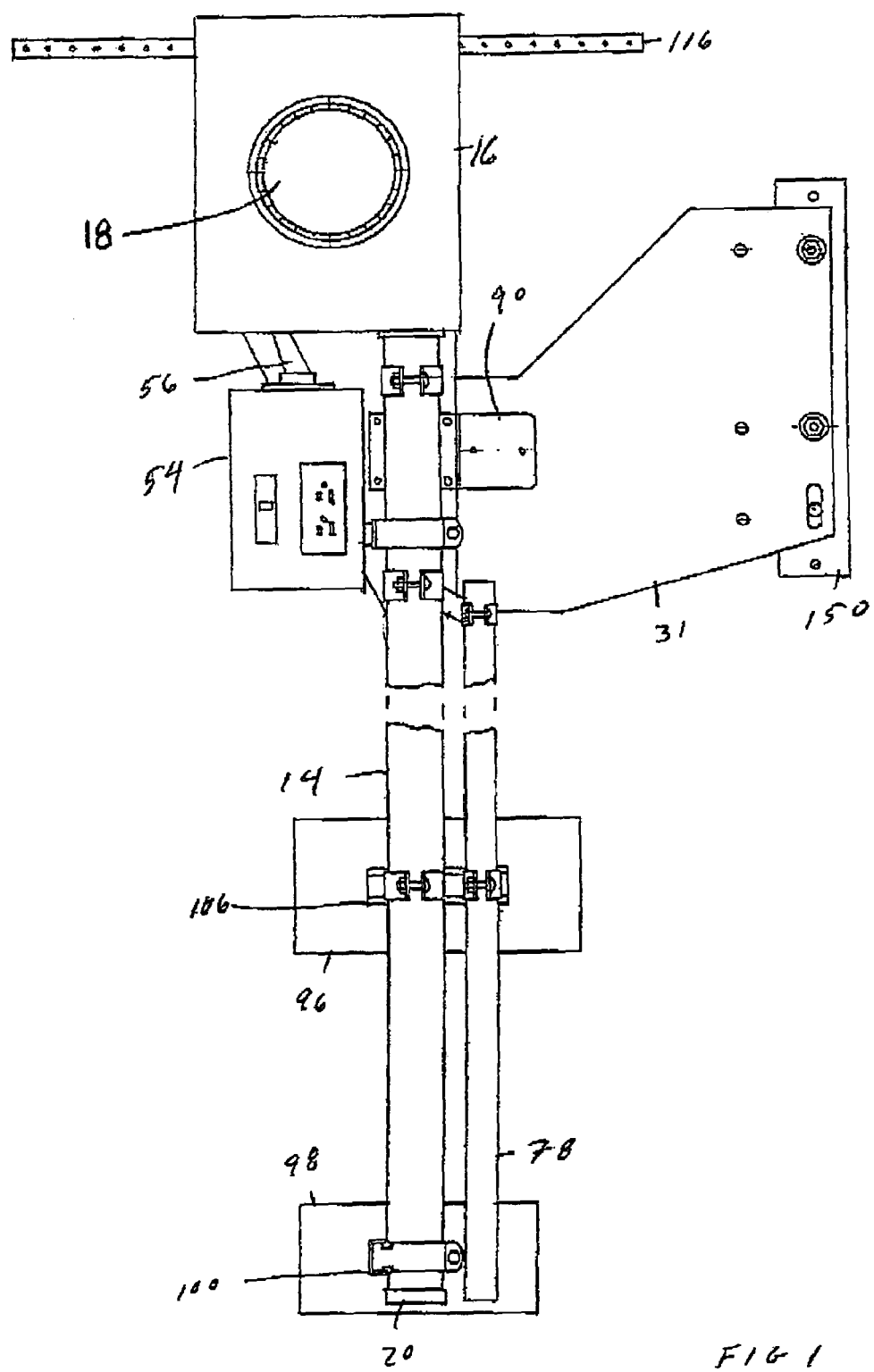
FIG. 1 is a broken, front elevation view of a preconstruction utility meter pedestal made in accordance with the principles of the present invention.

Referring now to the drawings, and in particular to FIGS. 1 and 2, the numeral 10 generally designates a preconstruction utility meter pedestal made in accordance with the invention. FIG. 2 shows the utility meter pedestal 10 operatively mounted on a poured concrete building foundation 12 for a building which would have the exterior walls covered with a conventional standard siding such as an aluminum siding. The utility meter pedestal 10 comprises an elongated, rigid steel pipe which is open, at the top and bottom ends thereof. A metal utility meter box 16 is rotatably, adjustably secured to the top end of the elongated rigid steel pipe 14 and has operatively mounted therein a conventional utility meter having a glass face 18 which extends forwardly through the front wall face of the utility meter box 16. The elongated rigid steel pipe 14 functions as both a vertical support member for the metal utility meter box 16 and an electrical service line conduit for conducting or housing an electrical service line, from an underground utility service line, to the utility meter in the metal utility box 16. As shown in FIGS.

1 and 2, the elongated rigid steel pipe 14 is provided on the lower end thereof with a conventional bushing 20 for the lower end of the elongated rigid steel pipe 14 for the reception of an underground electrical service line.

The upper end of the elongated rigid vertical steel pipe 14 extends through a suitable opening in the lower wall 24 of the metal utility meter box 16. The metal utility meter box 16 is rotatably, adjustably secured to the elongated rigid steel pipe 14 by a suitable outside lock nut 26 and an inside grounding locknut. A bushing is mounted on the upper end of the elongated rigid vertical steel pipe 14. The last described mounting structure for securing the utility meter box 16 to the upper end of the elongated rigid steel pipe permits the utility meter box 16 to be rotatably adjusted to a desired position on the elongated rigid steel pipe 14, as required by conditions encountered during the construction of a building wall on a foundation.

As shown in FIGS. 1–4, the utility meter pedestal 10 is provided with a pair of meter mounting plates 30 and 31 which have their upper end secured to the rear side of the electrical utility meter box 16 and gas utility meter box 17 by a plurality of suitable machine bolts which extend through the rear wall of the meter utility meter box and have operatively mounted thereon suitable locknuts. The bolts are permanently secured to the plates 30 and 31 by any suitable means, e.g., by having the heads thereof peened, so that the nuts can be removed from the front end of the bolts and the electrical utility meter box 16 or gas utility meter box 17 changed without removing the pedestal 10 from a building on which it is mounted.

Figure 4:
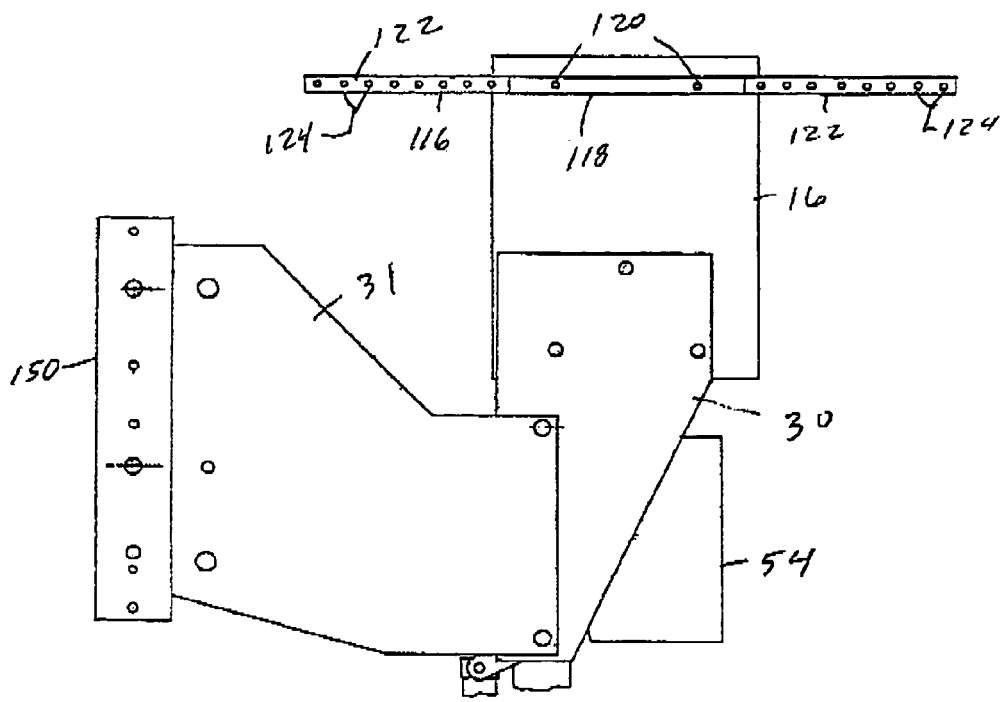
FIG. 4 is a rear elevation view of the gas meter mounting plate of the present invention.

As shown in FIG. 4, the gas meter mounting plate 31 is removably secured to the electrical meter mounting plate 30, preferably by means of commercially available bolts and nuts. The gas meter mounting plate is configured to provide the required spacing between the electrical meter and the gas meter while maintaining secure attachment to the pedestal via the electrical mounting plate (shown in FIG. 5). The gas meter mounting plate 31 may be provided separately, particularly to supplement existing preconstruction electrical utility meter pedestals. The gas meter mounting plate 31 can be added to existing pedestals after installation in fashion similar to the installation described above. In addition to saving the cost of an additional pedestal, installation costs of leveling and attaching the pedestal are reduced. The use of a single pedestal also facilitates the coordination of installing several or all utility lines to the dwelling into a single trench, which greatly reduces the utility installation costs. Further, the utility meters are located at a single compact site, minimizing the deleterious aesthetic effect of the meters. The gas meter mounting plate can be oriented on the opposite side (left side of FIGS. 1, 3 and 5) of the pedestal if the electrical meter is located on the right side of the pedestal opposite the orientation shown in FIGS. 1–3 and 5. The gas meter mounting plate 31 is rotated 180° about the pedestal before attachment and the bracket 150 is removed and attached to the opposite face of the mounting plate.

The utility meter pedestal 10 is provided with a temporary electric power box 54 which is disposed beneath the metal utility meter box 16, to the left of the elongated rigid steel pipe 14, as viewed from the front of the utility meter pedestal 10. The temporary electric power box 54 is provided with an upwardly extended conduit nipple 56, on the upper end thereof, and which is fixedly secured to said box 54 by any suitable means. The upper end of the conduit nipple 56 is extended through a suitable opening in the bottom wall of the metal utility meter box 16 and is secured to the lower wall 24 of the metal utility meter box 16 by an outside integral flange and inside locknut. Thus, once temporary electric power is no longer needed, the temporary electric power box can be disconnected. The temporary electric power box 54 is secured to the elongated rigid steel pipe 14 by a C-clamp generally indicated by the numeral 37. The clamp 37 is connected to a side wall of the temporary electric power box 54. The elongated rigid steel pipe 14 is releasably secured to the top back support plate 30 by a pair of C-shaped clamps 36 and 39 which are disposed about the temporary electric power box clamp 37. Again, the temporary electric power box 54 can be easily removed when it is no longer needed. Temporary power is supplied through a ground fault interrupter duplex outlet located in box 54 (See FIG. 1).

As shown in FIG. 2, the temporary power box 54 has a cover 55 to protect the outlet inside from the elements. Where appropriate, a notice in the form of a printed sticker is preferably placed upon the outside of the cover, requiring the temporary box 54 to be removed before a gas meter 17 is installed on the gas meter mounting plate 31. A similar notice is preferable placed upon the gas meter mounting plate. Thus, in areas where regulations consider the power box 54 to be a source of ignition, the installation of the gas meter 17 may be delayed until electric service is available within the dwelling, typically after the dwelling has been framed. At this point when heat (gas utility) would be most needed for interior work, electric service is typically available in the dwelling. Thus, the temporary box 54 can be removed and the gas meter 17 installed. Preferably, the gas and electric lines (and phone and cable lines) were installed in the same trench, and the gas line capped at the pedestal. Thus, the gas meter can be easily installed and gas utility service provided essentially on demand. In areas where an electric meter is considered and ignition source or if it is desirable to continue to use the temporary power box along with gas services, the plate 31 can be configured to extend away from the pipe 14 to create the spacing required by regulation (typically 3').

An attachment arm 62, in the form of an elongated flat plate, has an upper end thereof secured by a mounting bolt for the pipe clamp 39 to the top back plate 30. The other end of the attachment arm 62 is fixedly secured by a bolt and a suitable nut (not shown) and a conduit clamp, generally indicated by the numeral 68. The clamp 68 has a pair of integral curved clamp arms which are disposed around the upper end of a vertically disposed communication cable conduit 78. The C-clamp 68 functions to hold the upper end of the communication cable conduit 78 in a position spaced from the elongated rigid steel pipe 14 and in a position parallel thereto.

An adjustable mounting bracket generally designated at 80 accommodates a telephone interface box which can be installed at the same time that the utility meter pedestal 10 is installed, so as to allow one contractor to hook up both the electric and phone lines to a job site. The telephone interface box mounting bracket 80 includes an inner plate portion 82 which is releasably secured to the front face of the top back support plate 30, in an intermediate position vertically, between the elongated rigid steel pipe clamps 36 and 37, by a pair of suitable bolts and nuts. As shown in FIG. 3, the bracket inner plate portion 82 is provided at the right side thereof with an integral, forwardly extended flange 88, which is also integrally connected at its outer end to an outer plate portion 90 which is disposed parallel to the inner plate portion 82. The telephone interface box mounting bracket 80 is mounted in a position for the reception of a two line interface telephone box. If it is desired to mount a larger box containing more than two lines, then the bracket 80 may be moved outwardly to the right to accept a larger telephone box.

FIG. 2 illustrates the installation of the utility meter pedestal 10 on a building foundation 12 on which is to be mounted a building which is to have the outer walls thereof provided with a suitable siding, such as an aluminum siding. The utility meter pedestal 10 is illustrated as being fixedly mounted on the outer face of the building foundation 12 by a pair of mounting plates designated as an upper mounting plate 96 and a lower mounting plate 98. The upper and lower mounting plates 96 and 98 are secured to the outer face of the building foundation 12 by any suitable fastening means, such as by power driven nails 99.

As shown in FIG. 2, the lower end of the elongated vertical rigid steel pipe 14 is fastened to the lower mounting plate 98 by an adjustable clamping means, generally indicated by the numeral 100. The adjustable clamping means 100 includes a channel member which is disposed perpendicular to the outer face of the lower mounting plate 98, and which has its inner end fixedly secured to the lower mounting plate 98 by any suitable means, as by welding. The adjustable clamping means channel includes a bottom wall 102 and a pair of integral side walls 104. The free ends of the channel side wall edges which are rounded on the outer surface thereof and which are C-shaped in cross section. The adjustable clamping means 100 further includes a pair of C-shaped clamping straps or arms 108. Each of the clamp arms 108 have a T-shaped end which is slidably mounted in the adjustable clamping means channel member to permit sliding of the clamp arms 108 endwise in the channel shaped member but which are restrained from coming out of the channel shaped member by the T-shaped ends slidably engaging the inner ends of the C-shaped, rolled over channel side walls 106. The other ends of the clamp arms 108 are adapted to be fastened together by a suitable bolt and nut means for clamping the elongated rigid steel pipe 14 in a selected adjusted position in the channel shaped member of the adjustable clamping means 100.

As shown in FIGS. 1 and 2, the elongated rigid steel pipe 14 is adjustably secured, as a midpoint thereon, to the upper mounting plate 96 by an adjustable clamping means indicated generally by the numeral 106, and which is identical to the adjustable clamping means 100 for attaching the lower end of the elongated rigid metal pipe 14 to the lower mounting plate 98. The only difference is that the channel shaped member having a bottom wall 110 is welded in a flat position on the surface of the upper mounting plate 96 and in a position transverse, or 90 degrees relative to the position of the channel shaped bottom wall 102 of the adjustable clamping means 100. Accordingly, the adjustable clamping means 106 permits the elongated rigid steel pipe 14 to be adjusted in a direction 90 degrees to the adjustment of the adjustable clamping means 100, so as to permit lateral adjustment of the elongated rigid steel pipe 14 to plumb said pipe vertically during a mounting operation of the same on a building foundation.

Figure 5:
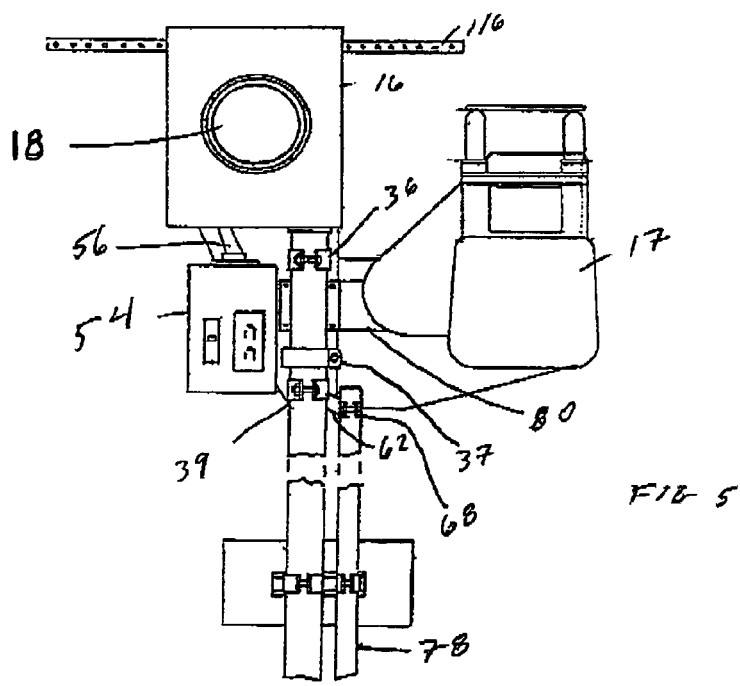
FIG. 5 is a broken front elevation view of the preconstruction utility meter pedestal illustrated in FIGS. 1 and 2 with a gas utility meter in place.

As shown in FIGS. 1 and 2 a conventional top mount transverse bracket, generally indicated by the numeral 116, is fixedly secured to the back of the electrical utility metal meter box 16, and said bracket 116 is attached to a building stud wall when the utility meter pedestal 10 is mounted on a building foundation on which is to be built a brick sided building. A longitudinal bracket 150 can be secured to the gas utility mounting plate 31 and to a building stud wall for brick constructions. If the utility meter pedestal 10 is to be attached to a sided building, then the bracket 116 is flattened out and it is attached directly to the building wall studs, and the bracket 150 not used and the plate 31 attached directly to the building wall. As shown in FIG. 5, the meter bracket 116 is provided with a central portion 118 that is secured to the back face of the metal utility meter box 16 by suitable fasteners, as by the bolt and nut combination indicated by the numeral 120. The outer end portions or bracket arms 122 of the meter bracket 116 are offset rearwardly from the central portion 118, a distance of approximately the thickness of a brick siding. The bracket arms 122 are adapted to be fastened to the studs of a building by nails driven through the holes 124 in the bracket arms 122.

In use, the utility meter pedestal 10 is assembled with all parts secured together in the positions shown in FIGS. 1 and 2. The utility meter pedestal 10 is then positioned against a building foundation 12, as shown in FIG. 2, with the upper and lower mounting plates 96 and 98, respectively, in the vertically spaced apart positions shown in FIG. 2, and with the lower mounting plate 98 in a position below foundation grade foundation.

The utility meter pedestal 10 is positioned with the elongated rigid steel pipe 14 in a vertical position and the upper and lower mounting plates 96 and 98, respectively, are fastened to the foundation 12 by power driven nails 99. If needed, a final plumb adjustment for the elongated rigid steel pipe 14 may be made, by adjusting the adjustable clamping means 100 and 106. A horizontal plumb for the communication cable conduit 78 may be carried out by adjusting the adjustable clamping means 106.

What is claimed is:

1. A preconstruction utility pedestal comprising:
  an elongated support member defining an inner side and an outer side and having a top end and a bottom end;
  a plate affixed on the inner side of said support member for attachment to a foundation wall for a building;
  a first bracket substantially parallel to said plate disposed on said support member for mounting an electric meter at the top end of said support member so said electric meter faces toward said outer side;
  an electric power outlet removably secured to said support member proximate to said first bracket and accessible from said outer side, said electric power outlet removably connectable to an electric meter; and
  a second bracket substantially parallel to said first bracket for mounting a gas utility meter, said second bracket affixed to said support member intermediate of said plate and said first bracket, said second bracket comprising a first meter mounting portion and a second elongated portion extending substantially perpendicular to and extending away from said support member to space meter mounting portion from said electric power outlet and said first bracket to a predetermined distance, said predetermined distance comprising at least a minimum safe distance.

2. The pedestal of claim 1 wherein said electric power outlet and said second bracket are disposed on opposite sides of said support member.

3. The pedestal of claim 1 further comprising a third bracket disposed on and spaced inwardly and parallel to said second bracket, said third bracket for attachment to a stud wall of said building.

4. The pedestal of claim 3 wherein said third bracket is spaced inwardly the width of a brick facia.

5. The pedestal of claim 1 further comprising a second plate affixed to said support member for attachment to a foundation wall.

6. The pedestal of claim 1 further comprising indicia on the outer surface of said second bracket instructing removal of said electric power outlet before installation of a gas utility meter.

7. A method of providing metered utility service to a building during construction comprising:
   mounting a pedestal to a foundation wall of said building by means of a plate affixed on said pedestal;
   laying electric supply line and gas supply line in a single in-ground trench to said pedestal;
   mounting an electric meter to said pedestal with a first bracket, said first bracket being substantially parallel to said plate;
   removably mounting an electric power outlet to said pedestal and operatively connecting said electric power out to said electric meter;
   operably connecting said electric supply line to said electric meter;
   mounting a gas meter to said pedestal intermediate of said plate and said first bracket with a second bracket, said second bracket being substantially parallel to said plate, said second bracket comprising a first meter mounting portion and a second elongated portion extending substantially perpendicular to and extending away from said support member to space meter mounting portion from said electric power outlet and said first bracket to a predetermined distance, said predetermined distance comprising at least a minimum safe distance; and
   operably connecting said gas supply line to said gas meter.

8. The method of claim 7 further comprising the step of disconnecting said electric outlet from said electric meter before operably connecting said gas supply line to said gas meter.

9. The method claim 7 further comprising the step of affixing a notice to said pedestal providing instructions to disconnect said electric outlet before mounting said gas meter.

10. The method of claim 7 further comprising installing a brick facia on said foundation wall, anchoring said electric meter and gas meter thereto.

11. The method of claim 7 further comprising the step of laying telephone service supply line in said trench.

12. The method of claim 7 further comprising the step of laying a signal transmission line in said trench.

13. The pedestal of claim 1 wherein said elongated support member comprises an open cavity, said open cavity being capable of receiving an electric supply line and a gas supply line.

14. The pedestal of claim 2 wherein said elongated support member comprises an open cavity, said open cavity being capable of receiving an electric supply line and a gas supply line.

15. The pedestal of claim 3 wherein said elongated support member comprises an open cavity, said open cavity being capable of receiving an electric supply line and a gas supply line.

16. The pedestal of claim 4 wherein said elongated support member comprises an open cavity, said open cavity being capable of receiving an electric supply line and a gas supply line.

17. The pedestal of claim 5 wherein said elongated support member comprises an open cavity, said open cavity being capable of receiving an electric supply line and a gas supply line.

* * * * *

UNITED STATES PATENT AND TRADEMARK OFFICE
CERTIFICATE OF CORRECTION

PATENT NO. : 7,085,128 B2  Page 1 of 1
APPLICATION NO. : 10/733206
DATED : August 1, 2006
INVENTOR(S) : M. Scott Wilfong It is certified that error appears in the above-identified patent and that said Letters Patent is hereby corrected as shown below:

Column 6, Line 19    After "temporary" insert -- power --
Column 6, Line 28    After "temporary" insert -- power --
Column 6, Line 34    Please delete "and" and insert -- an --

Signed and Sealed this

Twenty-sixth Day of December, 2006

JON W. DUDAS
*Director of the United States Patent and Trademark Office*